July 2, 1940.  J. J. HILL  2,206,353

PREFORMED KNOCK-DOWN DISPLAY ARTICLE

Filed June 2, 1937   5 Sheets-Sheet 1

Jesse J. Hill
INVENTOR

BY Victor J. Evans & Co.
ATTORNEYS

July 2, 1940.  J. J. HILL  2,206,353
PREFORMED KNOCK-DOWN DISPLAY ARTICLE
Filed June 2, 1937  5 Sheets-Sheet 2
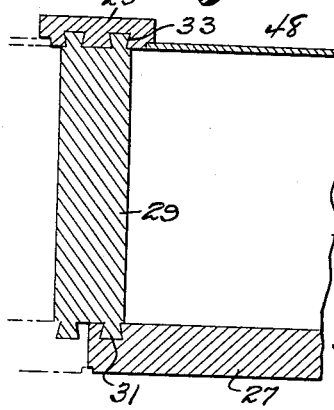
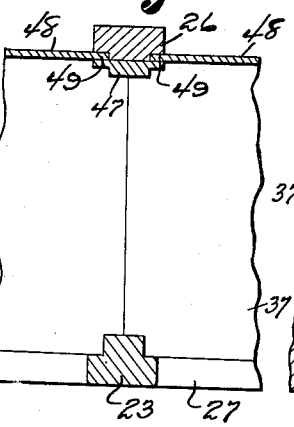
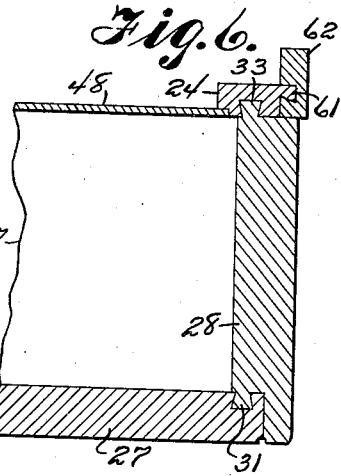
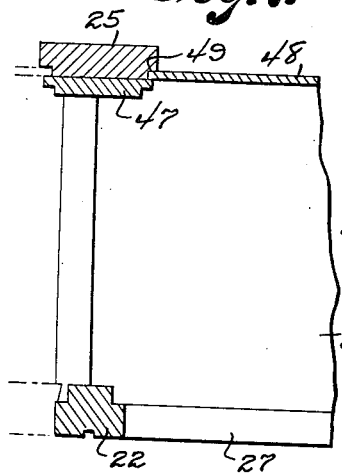
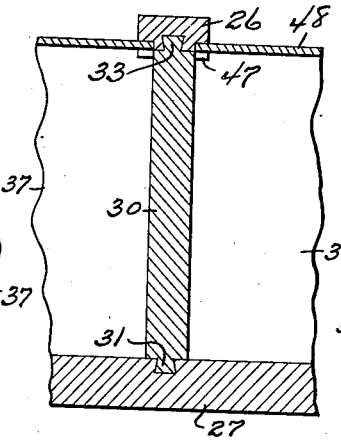
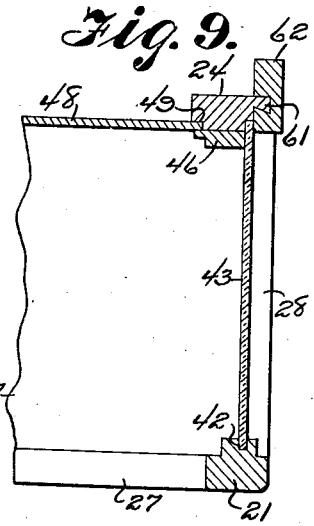
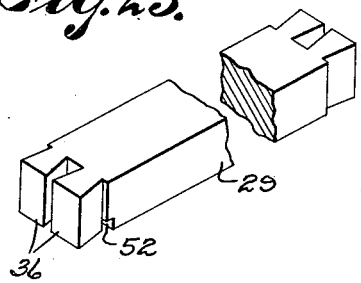
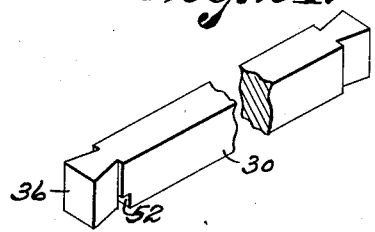
Jesse J. Hill
INVENTOR
BY Victor J. Evans & Co.
ATTORNEYS July 2, 1940.  J. J. HILL  2,206,353
PREFORMED KNOCK-DOWN DISPLAY ARTICLE
Filed June 2, 1937   5 Sheets-Sheet 3
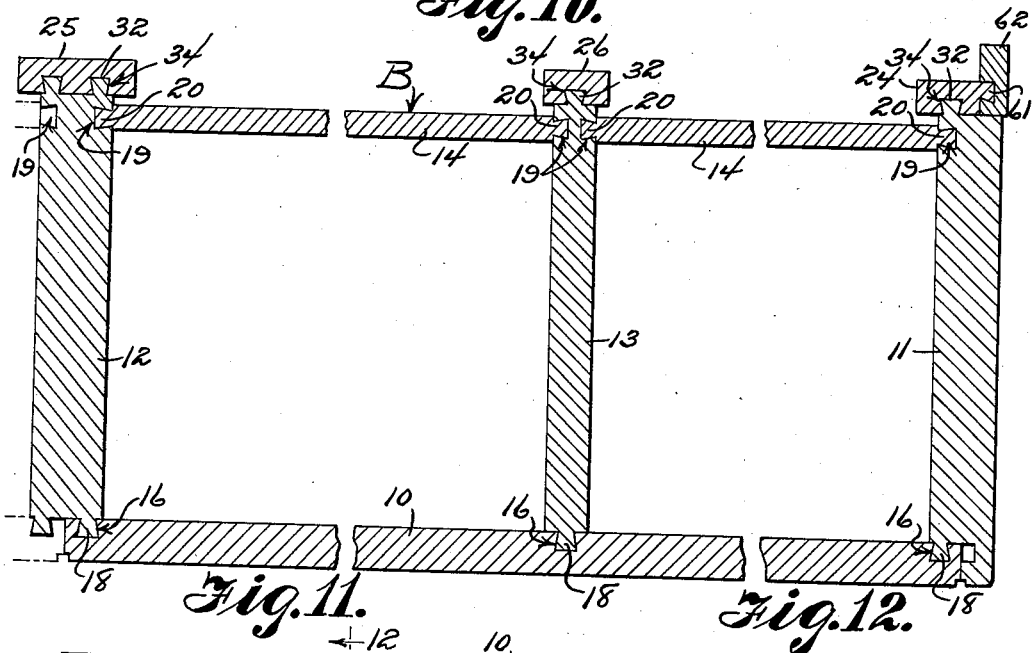
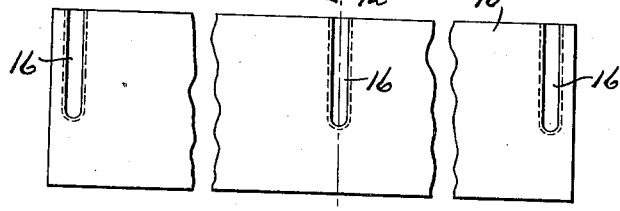
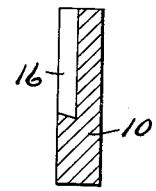
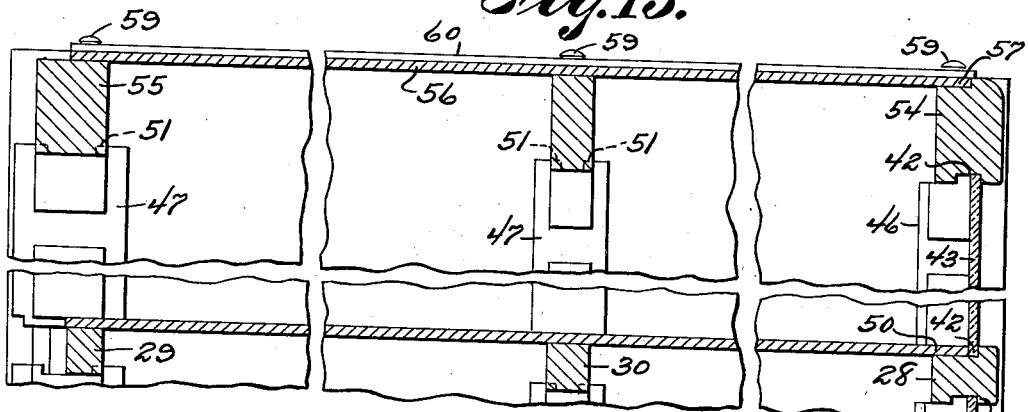
Jesse J. Hill
INVENTOR
BY Victor J. Evans & Co.
ATTORNEYS

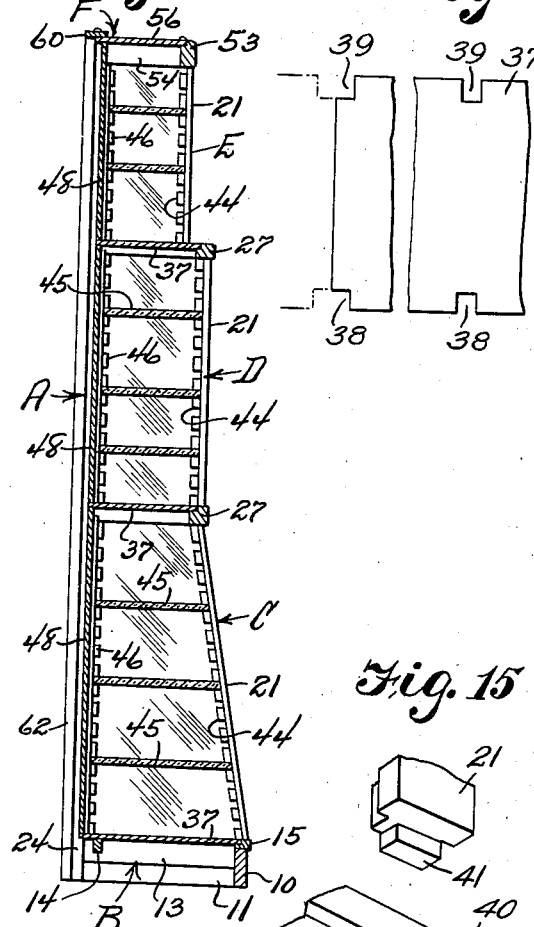
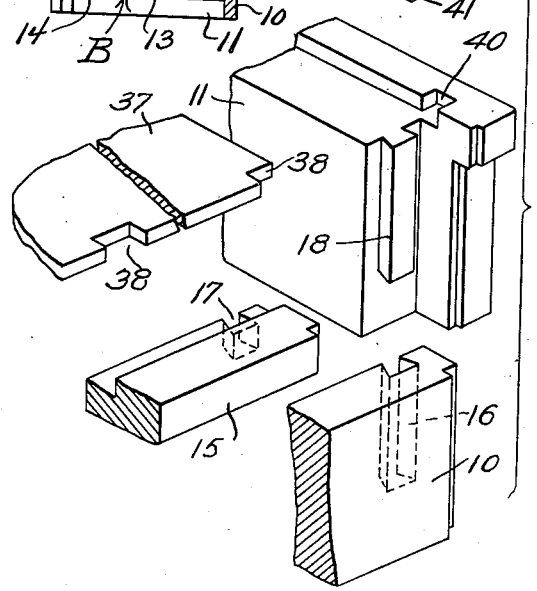
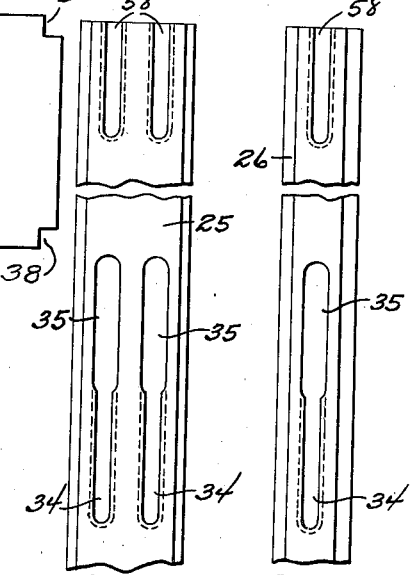

July 2, 1940.　　　　　J. J. HILL　　　　　2,206,353
PREFORMED KNOCK-DOWN DISPLAY ARTICLE
Filed June 2, 1937　　　5 Sheets-Sheet 5
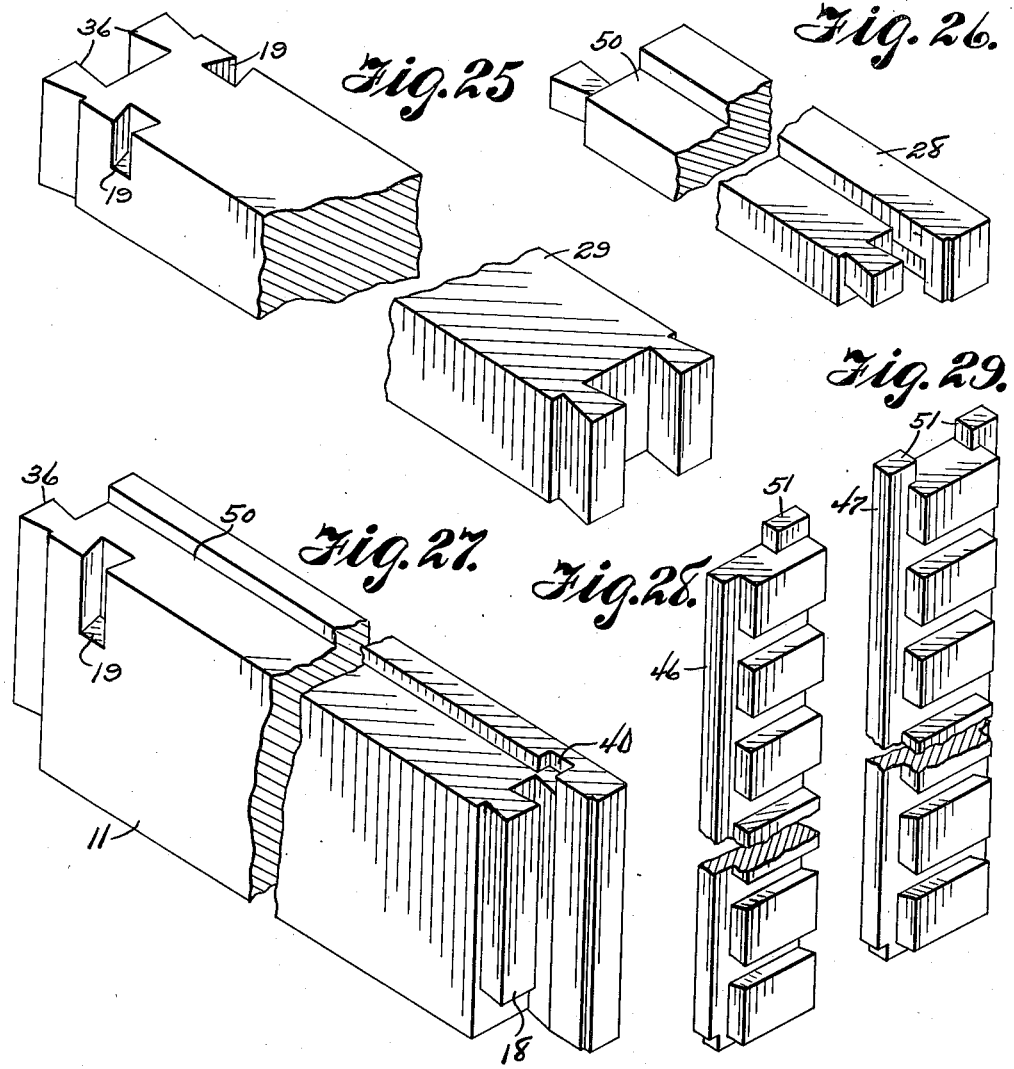
Jesse J. Hill
INVENTOR
BY Victor J. Evans & Co.
ATTORNEYS Patented July 2, 1940

2,206,353

UNITED STATES PATENT OFFICE 2,206,353

PREFORMED KNOCK-DOWN DISPLAY ARTICLE

Jesse J. Hill, Quincy, Ill.

Application June 2, 1937, Serial No. 146,053

1 Claim. (Cl. 312—108)

The invention relates to preformed knockdown articles and more especially to store or showroom display furniture or fixtures of knockdown type.

The primary object of the invention is the provision of furniture or fixtures of this character, wherein the parts thereof are of a construction to permit of the setting up of the same without requiring skilled labor and without the use of glue, nails, screws or other like fasteners and will be possessed of a finish similar to a factory assembled article of furniture or that erected by skilled labor or artificers, the parts being interfitted and interlocked securely on erection of such furniture or fixture in a manner for maintaining rigidity and strength thereto.

Another object of the invention is the provision of furniture or fixtures of this character, wherein articles of merchandise may be held on display in mercantile establishments, such as, stores, display rooms or the like and will be possessed of a completed and finished appearance as well as ornamental and attractive and may be readily and easily increased in size, being collapsible or of the knock-down type and the parts thereof preformed so that assembly may be had with dispatch and without requiring skilled labor or artificers for so doing.

A further object of the invention is the provision of furniture or fixtures of this character, wherein the parts thereof are of sectional kind and are preformed and interfitting and interlocking with each other for the building of such furniture or fixture.

A still further object of the invention is the provision of furniture or fixtures of this character possessed of simplicity and durability, strong, set up or knocked down with ease and dispatch and also inexpensive to manufacture, being thoroughly reliable and effective in operation.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claim hereunto appended.

In the accompanying drawings:

Figure 4 is a fragmentary enlarged transverse sectional view taken on the line 4—4 of Figure 1 looking in the direction of the arrows.

Figure 5 is an enlarged fragmentary sectional view taken on the line 5—5 of Figure 1 looking in the direction of the arrows.

Figure 6 is an enlarged transverse sectional view taken on the line 6—6 of Figure 1 looking in the direction of the arrows.

Figure 7 is a sectional view on the line 7—7 of Figure 1 looking in the direction of the arrows.

Figure 8 is a sectional view on the line 8—8 of Figure 1 looking in the direction of the arrows.

Figure 9 is a sectional view on the line 9—9 of Figure 1 looking in the direction of the arrows.

Figure 10 is a sectional view on the line 10—10 of Figure 1 looking in the direction of the arrows.

Figure 11 is a fragmentary mutilated rear elevation of the front base rail of the furniture or fixture.

Figure 12 is a sectional view on the line 12—12 of Figure 11 looking in the direction of the arrows.

Figure 13 is a sectional view on the line 13—13 of Figure 2 looking in the direction of the arrows.

Figure 14 is a sectional view on the line 14—14 of Figure 1 looking in the direction of the arrows.

Figure 15 is an exploded perspective view illustrative of a joint assembly employed in the structure.

Figure 16 is a front elevation of a back mullion strip of the furniture or fixture of the double router and dovetail slotted construction.

Figure 17 is a sectional view on the line 17—17 of Figure 16 looking in the direction of the arrows.

Figure 18 is a sectional view on the line 18—18 of Figure 16 looking in the direction of the arrows.

Figure 19 is an elevation of a back mullion of the single router and dovetail slotted type.

Figure 20 is a sectional view on the line 20—20 of Figure 19 looking in the direction of the arrows.

Figure 21 is a sectional view on the line 21—21 of Figure 19 looking in the direction of the arrows.

Figure 22 is a fragmentary top plan view of a ply wood bottom for the furniture or fixture.

Figure 23 is a perspective view partly broken away of an end joinder lock rail.

Figure 24 is a perspective view of the center lock rail.

Figure 25 is a view similar to Figure 23 showing a supplemental joinder lock rail.

Figure 26 is a perspective view of a combined lock rail and end piece.

Figure 27 is a perspective view of a combined lock rail and base end piece.

Figure 28 is a fragmentary perspective view of a half-sized ratchet strip.

Figure 29 is a fragmentary perspective view of an end ratchet strip.

Similar reference characters indicate corresponding parts throughout the several views in the drawings.

Figure 1:
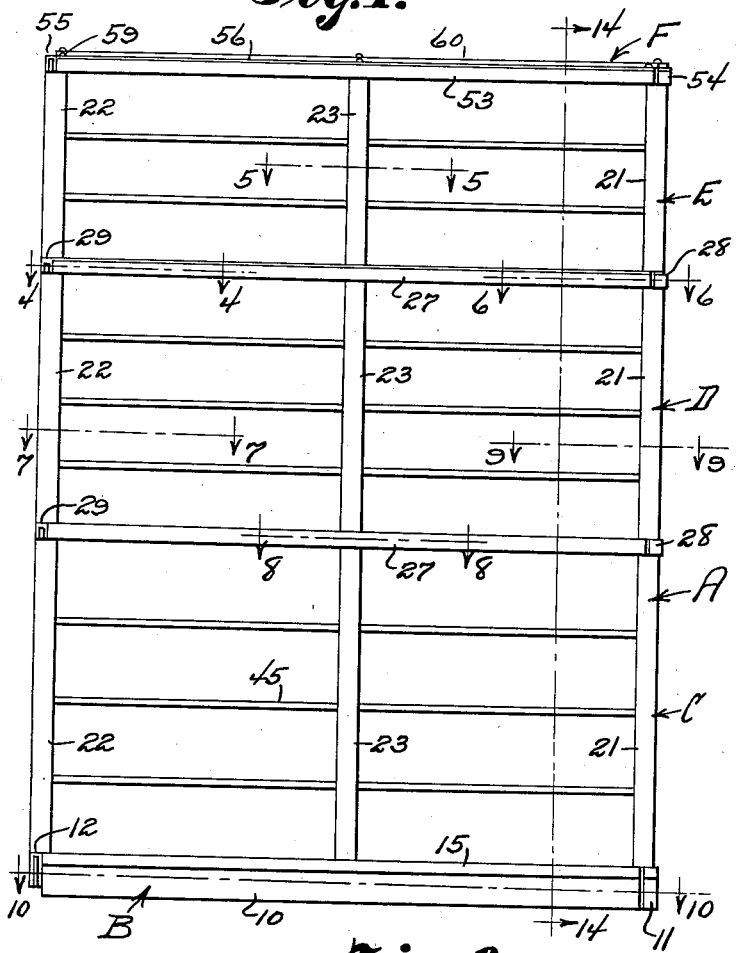
Figure 1 is an elevation of a wall showcase constructed in accordance with the invention.
Figure 2:
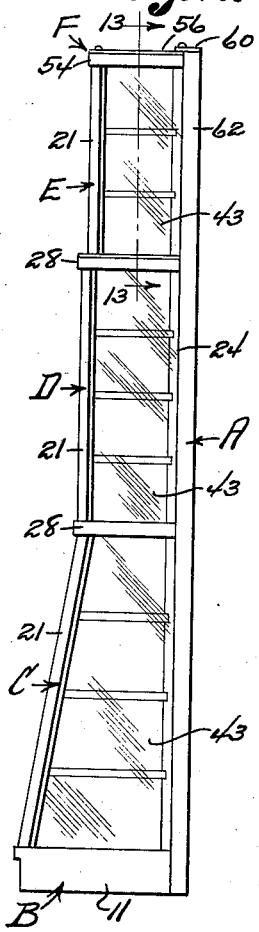
Figure 2 is an end view thereof.
Figure 3:
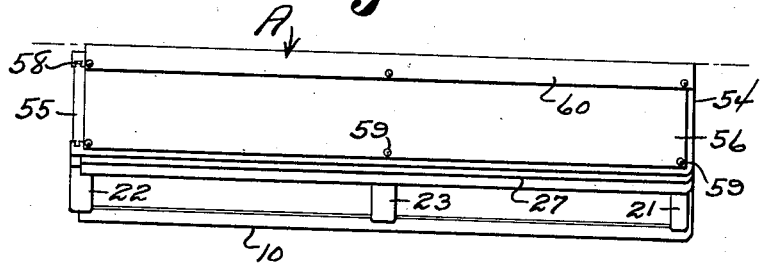
Figure 3 is a top plan view.

Referring to the drawings in detail, particularly with respect to the preferred embodiment of the invention, there is shown a wall case designated generally at A of the knock-down or collapsible type and this case is constructed from preformed parts, preferably made from wood, including a base or bottom unit B of substantially rectangular shape having a front base rail 10, end base rails 11 and 12, an intermediate base lock rail 13 and sectional rear lock base supports 14, respectively, the end rail 11 being a combined lock and outer finishing base rail while the end rail 12 is a combined lock rail and coupling base piece for the joinder of another base unit for an additional wall case when required as a supplemental one. The front base rail 10 next to opposite ends thereof in its innermost face has vertically formed therein dovetailed grooves 16 which open through the top edge thereof, the ledge piece 15 being also formed with similar grooves 17 registering with the grooves 16 for accommodating dovetailed tongues 18 provided at the forward edges of the end rails 11 and 12 and the intermediate lock rail 13 for said base so that these rails will separably interlock with the front base rail 10. The lock rail 13 is of less depth than the end rails 11 and 12 and all of these rails next to the rearmost ends thereof are formed with dovetailed grooves 19 for accommodating dovetaied tongues 20 on the sections of the rear base supports 14 so that the said rails and supports will be separably interlocked with each other at the rear of the base B, these grooves 19 being extended through the upper edges of the rails 11, 12 and 13.

Vertically arranged above the base or bottom unit are the body units C, D and E, respectively, each including outer and intermediate front stiles 21, 22 and 23, respectively, and outer and intermediate back mullions 24, 25 and 26, respectively. Between the body units C, D and E are ledge framings each including a front ledge piece 27, end pieces 28 and 29 and an intermediate lock piece 30, respectively, the end pieces 28 and 29 being interlocked with the front piece 27 by tongue and groove connections 31 while the mullions 24, 25 and 26 have the tongue and groove connections 32 with the rails 11, 12 and 13 and similarly the pieces 28, 29 and 30 have the tongue and groove connections 33 with these mullions 24, 25 and 26, respectively. The mullions 24, 25 and 26, each has formed vertically therein the dovetail grooves 34, these merging into router or straight walled entrance slots 35 so as to separably accommodate the dovetail tongues 36 as formed on the pieces 28, 29 and 30, respectively, and similarly the tongues on the rails 11, 12 and 13, respectively. Accommodated on the rails 11, 12 and 13 and on the pieces 28, 29 and 30 of the base or bottom unit and the ledge framings, respectively, are ply wood floor boards 37, they being sized and shaped in conformity therewith and have their front edges notched at 38 for fitting about the outer and intermediate front stiles 21, 22 and 23, respectively, while the rear edges of these boards 37, each is provided with the notches 39 for fitting about the mullions 24, 25 and 26, respectively.

The front stiles are separably interlocked with the base or bottom unit, the ledge framings and flooring boards, respectively, the upper and lower ends of said stiles being formed with tenons 41. The tenons 41 are fitted in notches 40 and 38, respectively, formed in the end pieces 11 and the floor boards 37.

The end rails 11, end pieces 28 and the outer stiles 21 and mullions 24 are channeled at 42 for fitting in the units C, D and E at the outer ends thereof of glass panels 43 while the stiles 21, 22 and 23 are ratchet faced to provide racks 44 for adjustably accommodating shelves 45 which also engage with ratchet faced racking pieces 46 and 47, respectively, separably fitted against the mullions 24, 25 and 26 and overlying ply wood back sections 48 fitting the said mullions 24, 25 and 26 and seated at 49 therein for closing the back of the case. These sections 48 at their top and bottom edges meet the flooring boards 37 between the units B, C, D and E, respectively. The floor boards 37 are accommodated in seats 50 as provided in the rails 11, 12 and 15 of the base or bottom unit B and the end pieces 27, 28 and 29 of the ledge framings, respectively. The racking pieces 46 and 47 separably interlock at 51 with the end and intermediate rails and end and intermediate pieces of the base or bottom unit and the ledge framings, respectively. The end pieces 28 and 29 and the intermediate lock pieces 30 are provided with seats 52 for the tenon ends 51 of the rack pieces 46 and 47, respectively.

Capping the wall case A and fitting the unit E thereof is a top unit F which includes a front ledge rail 53, end pieces 54 and 55, respectively, and a cover piece 56, the latter being counterseated at 57 in the rail 53 and end pieces 54 and 55 while the said end pieces have dovetail connections 58 with the rail 53 and the back mullions 24 and 25 while the cover piece 56 is fastened seated by male and female snap fasteners 59 while certain of the latter separably secure in place a top dust strip 60. The back mullion 24 has dovetail connection at 61 with an end dust strip 62 which in association with the strip 60 avoids accumulation of dust and dirt rearwardly of the case A when set up against a vertical wall with the back of the case confronting said wall and slightly spaced therefrom.

What is claimed is:

A knock-down article of furniture comprising a body including a plurality of units, each having outer and intermediate front stiles, respectively, outer and intermediate back mullions, respectively, rearwardly of said units and having dovetailed grooves, ledge framings between the units with the stiles separably joined therewith and each including front, end and intermediate lock pieces, respectively, interlocked with each other, said front pieces being provided with dovetailed grooves, dovetailed tongues formed on the end and intermediate pieces and separably engaged with the dovetailed grooves in the front ledge pieces, and dovetailed tongues on the end and intermediate pieces separably engaged in the dovetailed grooves in said mullions for connecting the units and framings together.

JESSE J. HILL.